United States Patent [19]
Townsend

[11] 4,130,190
[45] Dec. 19, 1978

[54] BRAKE ACTUATING DEVICES

[76] Inventor: David J. Townsend, F1, 37 Dyott Rd., Birmingham B13 9AZ, England

[21] Appl. No.: 761,905

[22] Filed: Jan. 24, 1977

[51] Int. Cl.$^2$ .............................................. B60T 1/14
[52] U.S. Cl. ...................................................... 192/5
[58] Field of Search ............... 188/2 D, 24, 26, 82.84; 192/5, 27, 45, 47, 64

[56] References Cited

U.S. PATENT DOCUMENTS

| | | | |
|---|---|---|---|
| 611,073 | 9/1898 | Morrow | 192/5 |
| 858,548 | 7/1907 | Vincent | 192/27 |
| 1,134,283 | 4/1915 | Mursch | 192/27 |
| 1,985,127 | 12/1934 | Wemp | 192/47 |
| 2,143,121 | 1/1939 | Cox | 192/47 |
| 2,299,739 | 10/1942 | Colucci | 192/47 |
| 3,412,620 | 11/1968 | Bloom et al. | 192/27 |
| 3,586,143 | 6/1971 | Hutchinson | 192/47 |
| 3,888,334 | 6/1975 | Mack | 188/24 |

FOREIGN PATENT DOCUMENTS

911467  5/1954  Fed. Rep. of Germany ............ 188/24

*Primary Examiner*—Gerald A. Dost
*Attorney, Agent, or Firm*—LeBlanc & Shur

[57] ABSTRACT

A force take-off device which is particularly suitable for use in a brake actuating device for a pedal driven vehicle comprising inner and outer rotatable elements having a formation between said elements which has engaged and disengaged conditions, said condition being determined by the direction of rotation of one of said rotatable elements.

9 Claims, 2 Drawing Figures

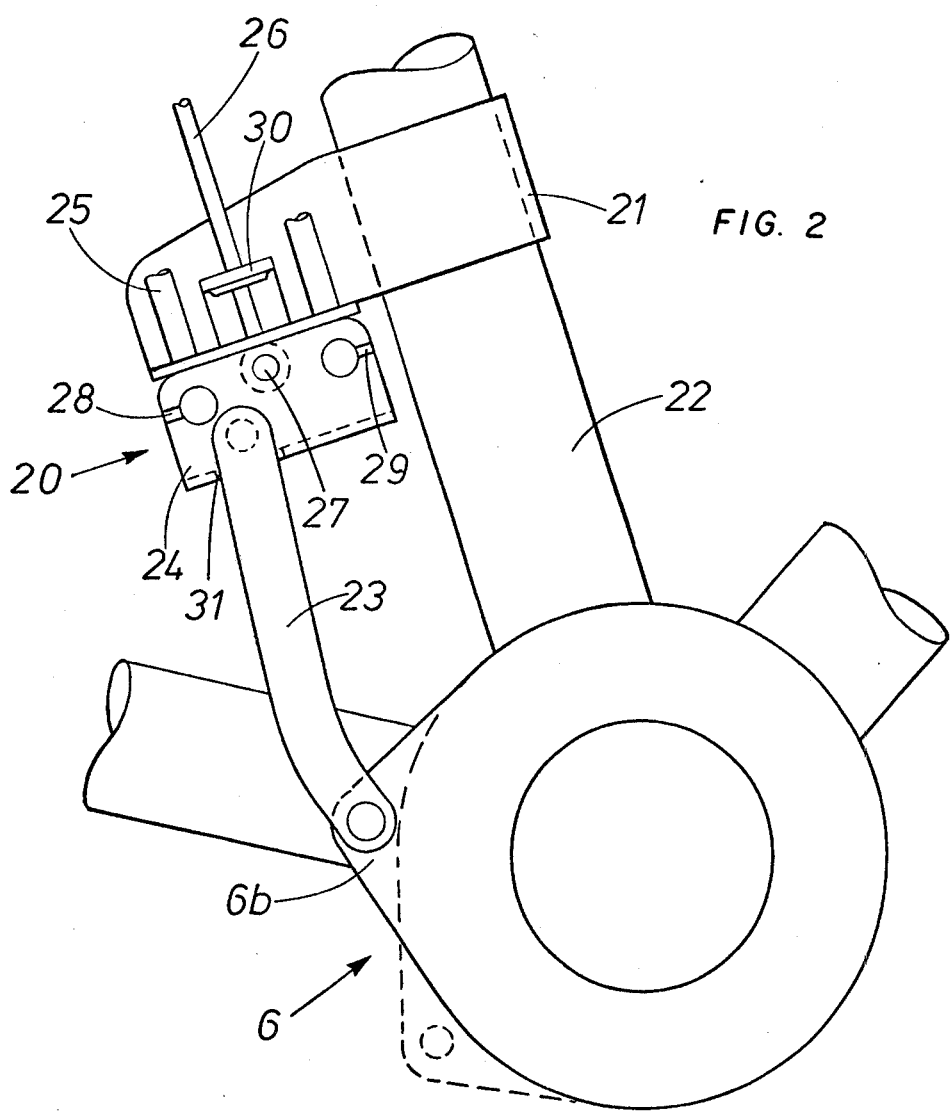

BRAKE ACTUATING DEVICES

This invention relates to brake actuating devices, including force take-off devices and force transmitting devices.

It is an object of the present invention to provide a force take-off device for attachment to a rotary member which will not be actuated when said rotary member is rotated in one direction but will be actuated when the member rotates in the other direction.

It is a further object of the invention to provide a braking means for a pedal actuated vehicle in which the braking means is actuated by rotating the pedals in the reverse direction.

It is a still further object of the invention to provide a force transmitting system which is suitable for use with a force take-off device of the present invention.

It is a still further object of the invention to provide a braking system for a vehicle which is operated by reversing the rotation of a rotary member.

According to one aspect of the present invention I provide a force take-off device for attachment to a rotary member, which device is so arranged that when attached to the rotary member it will permit rotation of said rotary member in one direction (referred to herein as a "forward direction"), but when the rotary member is driven in the opposite direction (referred to herein as a "reverse direction") a force is transmitted to a movable element which is adapted to be secured to a force transmitting system.

The rotary member may be part of a pedal vehicle such as a bicycle and may be, for example, a chain wheel or a member associated therewith.

The force transmitting system may comprise a brake actuating system and may also include if desired means for automatic adjustment thereof.

Preferably the device comprises an inner rotatable element and an outer rotatable element and a formation therebetween which permits free rotation in one direction but prevents rotation in the opposite direction.

In one particular embodiment the formation comprises at least one rolling element disposed in a cooperating groove which, at one end has a dimension sufficiently large to permit rotation of the rolling element, and, at the other end, a dimension sufficiently small for the rolling element to be gripped between the groove surfaces so that when the rolling element is urged towards the smaller diameter end of the groove by rotation of the rotary element in a reverse direction a locking action is produced.

In a preferred embodiment of the invention the rolling elements are controlled by a control device which normally holds the rolling elements out of engagement with the bearing surfaces but is actuatable to permit the rolling elements to move into the locking position. Preferably the control device is actuatable by means associated with the rotary element.

Conveniently, the control device is actuatable by an actuating member which permits a predetermined rotation of the rotary member in a reverse direction before actuating the control device to permit the rolling elements to move towards the locking position. It is desirable that a release plate be operatively connected to the rotatable element so that when it is rotated in a forward direction the release plate causes the rolling elements to be released from the engaged position. This arrangement greatly facilitates the initial rotation in the forward direction particularly when the rolling elements have been forced against the bearing surfaces of said grooves to such an extent that they would not release themselves without the intervention of mechanical releasing means.

If desired the control device may be actuated by separate or auxiliary means such as manually operable actuating means.

BRIEF DESCRIPTION OF THE DRAWINGS

FIG. 2 is a diagrammatic side elevation of a force transmitting system shown connected to a force take-off device according to the present invention.

Figure 1:
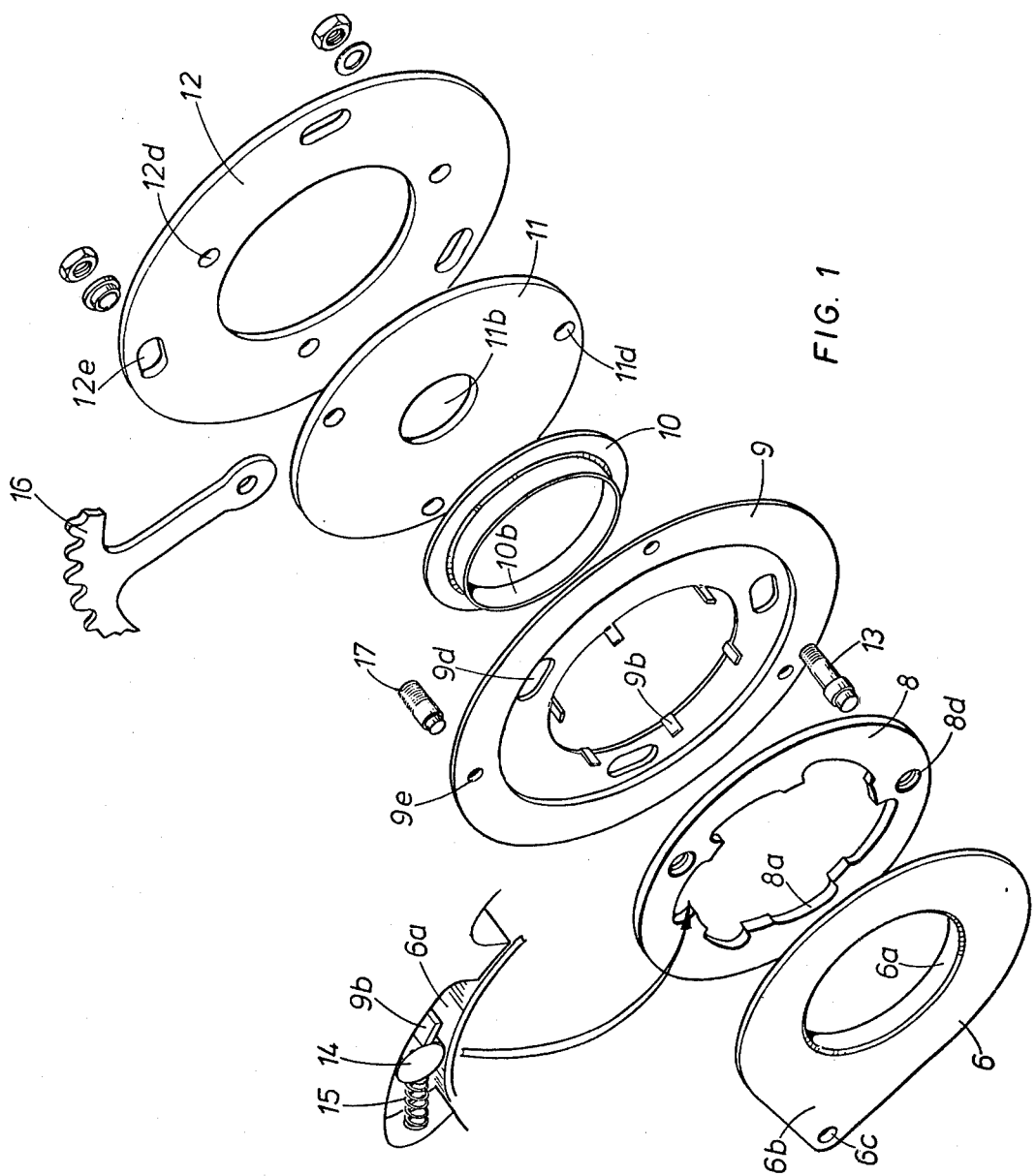
FIG. 1 is an exploded perspective view of a force take-off device according to the invention.

The device shown in FIG. 1 comprises an actuator plate 6 having a flange 6a which forms a bearing surface with rollers 14, a cam plate 8 having cam surfaces for receiving the rollers 14, a release plate 9, a retainer 10, a pedal crank plate 11 and a delay plate 12.

The actuator plate includes a cylindrical flange 6a and a projecting portion 6b having an aperture 6c whereby an operating lever may be connected thereto.

A cam plate includes six cam surfaces 8a, detail of the shape of which is shown in the inset. The cam plate is also provided with three radially distributed apertures 8d for receiving retaining threaded elements 13 which are riveted in apertures 8d.

It will be seen from the drawing that when the cam plate 8 is assembled with the actuator plate 6 that rollers disposed between the cam surfaces 8a and the flange 6a rotation of the cam plate 8 will be permitted in a clockwise direction, but when it is rotated in an anti-clockwise direction the rollers will be trapped between the surfaces 8a and flange 6a causing rotation of the actuator plate 6.

The release plate 9 includes a series of apertures 9e and thre slots 9d. The plate 9 is of annular form and includes inner projections 9b which control the positions of the rollers 14 between the respective bearing surfaces. Thus, the release plate 9 operates in the manner of a cage for retaining the rollers 14 and the position of this cage relative to the cam plate 8 will determine whether or not any force is transmitted to the actuator plate 6. Threaded members 17 are riveted in the apertures 9e.

The brake retainer comprises an annular plate 10 having an inturned portion 10b.

The pedal crank plate 11 comprises an annular plate having an inner diameter 11b of a size to suit the size of the pedal crank boss and having three radially distributed apertures 11d. A portion of the chain wheel is shown diagrammatically at 16.

The brake delay plate includes three radially distributed apertures 12d and three radially distributed slots 12e.

The various plates are assembled as shown in FIGS. 1 and 2 with bolts 13 passing through the apertures 8d, slots 9d, apertures 11d and apertures 12d in the plates. The bolts 17 pass through the apertures 9e and the slots 12e.

The device is, in use, attached to the chain wheel 16 of a bicycle so that the pedal crank plate rotates with the chain wheel 16. During normal forward running of the bicycle the pedal crank plate causes the delay plate, the brake release plate and the cam plate to rotate in the same direction, the rollers being disposed within the cam surfaces 8a in the disengaged position which does not cause any rotation of the actuator plate. When the chain wheel of the bicycle is rotated in the reverse direction by the pedals, however, the pedal crank plate again rotates therewith and by virtue of the bolts 13 the delay plate 12 is caused to rotate therewith.

The first portion of the movement is taken up by the slots 12e which then after a short period of time cause the brake release plate 9, by virtue of the threaded members 17 in the apertures 9e, to rotate in the reverse direction and the projections 9b move the rollers towards the locking position between the cam surfaces 8a and the projections 6a on the actuator plate 6. The actuator plate is thus caused to rotate and this rotation may be used to operate a brake system for the bicycle.

It will be appreciated that movement of the chain wheel in the forward direction will cause the respective plates to adopt their original position permitting free movement of the chain wheel and associated plates relative to the actuator plate.

The force take-off device as described above is particularly convenient for use as a braking device on a bicycle, the braking action being caused by back-pedalling. The braking action is particularly reliable and the arrangement described above permits the bicycle to be wheeled forwards or backwards without engagement of the rollers with the bearing surfaces taking place and is also effective in producing a positive release of the rollers from the engaged position to facilitate the bicycle being pedalled after a braking action has taken place.

According to another aspect of the invention, I provide a force transmitting system, such as a brake actuating system, including connecting means for connecting to means for operating the system such as a force take-off device as described herein, and said connecting means being arranged to have at least one brake cable secured thereto and being movable relative to fixed means in response to movement of said means for operating the system.

The brake connecting means may have two brake cables secured thereto and may be arranged so as to be adjustable, preferably self-adjustable, relative to the fixed means. This may be achieved, conveniently, by the use of an elongate member associated with the connecting means and passing through a bore in the fixed means, said elongate member carrying an abutment element for abutment with the fixed means to adjust the position of the connecting means relative thereto. Self-adjusting properties may be obtained by the use of an abutment member which is slidable on the elongate member in one direction only and which resists movement in the opposite direction.

Where two brake cables are connected to the connecting means, said means are preferably connected to the elongate member at a position intermediate the cable connections.

The connecting means are desirably connected to the means for operating the system by means of a connecting arm pivoted thereto. The connecting arm may be pivoted to the connecting means at a position intermediate the cable connections where two brake cables are employed and may be offset to give a predetermined distribution of braking force between the two cables.

The force transmitting system 20 is shown in FIG. 2 fixed by means of a bracket 21 to a frame member of a bicycle 22.

The actuator plate 6 on a force take-off device is shown in solid lines in the "brake-off" position and in dotted lines in the "brake-on" position.

The portion 6b of the actuator plate 6 is pivotally connected to a connecting arm 23 which in turn is pivotally connected to connecting means 24. The connecting means 24 is supported on fixed means 25 by an elongate rod 26 pivotally attached to the connecting means 24 at a position 27. Slots 28 and 29 receive the bosses at the end of Bowden type cables which are used for operating the front and rear brakes respectively of the bicycle.

When the actuating element is moved to the "brake-on" position the connecting arm 23 causes the connecting means 24 to move relative the fixed means 25 thereby actuating both front and rear brakes via the cables connected at 28 and 29.

The system is capable of self-adjustment by virtue of the provision of washer 30 which is of a type which permits movement of the elongate rod 26 in one direction but prevents it in the opposite direction. Thus, the washer 30 acts as an abutment against the fixed means 25 and automatically adjusts the position of the connecting means 24 relative thereto to compensate for the condition of the brake pads.

As shown in FIG. 2 connecting arm 23 is pivoted to the connecting means 24 at a position which is offset towards the connection 28. This arrangement provides for a greater braking force to be applied to the cable attached at 28 than that applied to the cable attached at 29, the precise position being predetermined to give the desired distribution of braking effect.

The slot 31 in the base of the connecting means 24 allows limited angular movement of the arm 23 to provide a minimum fail-safe deflection of alignment in the event of failure of one brake, brake mechanism or brake cable or casing.

The system described above is particularly reliable in operation and has a very convenient self-adjustment feature. In addition it also possesses a safety feature in that should one of the brake operating cables break the connecting means 24 will pivot by virtue of the tension applied by the connecting arm 23 and thereby cause the other brake to be operated.

What is claimed is:

1. A braking means for a pedal actuated vehicle comprising: a first rotatable element and a second rotatable element; a formation between said first and said second rotatable elements, which has engaged and disengaged positions, the position of said formation being determined by the direction of rotation of one of said rotatable elements so that when the formation is in the engaged position the two rotatable elements are caused to rotate together, and when the formation is in the disengaged position the two rotatable elements can rotate relative to one another; a control device for moving the formation to the disengaged position during forward rotation of one rotatable element with respect to the other rotatable element, wherein the control device is arranged so that backward rotation of one rotatable element with respect to the other causes said formation to move to the engaged position; a braking force transmitting system coupled to a pair of braking force transmitting cables; means for securing one of said rotatable elements to a rotatable drive member of the pedal actuated vehicle; and means for connecting the other of said rotatable elements to said braking force transmitting system.

2. A braking means according to claim 1, in which said formation comprises at least one rolling element disposed in a co-operating groove defined between said first and second rotatable elements, said groove having a dimension at one end larger than that of the rolling element to permit rotation of the rolling element and, having at the other end a dimension smaller than that of the rolling element, so that when the rolling element is disposed at said other end the rotatable elements are caused to rotate together.

3. Braking means according to claim 1, wherein said braking force transmitting means comprises a fixed element, an arm pivoted to a connecting means, said connecting means being secured to an elongate rod, said connecting means and said rod being movable with respect to said fixed element in response to movement of said arm, said connecting means having a pair of slots to receive and retain the ends of said respective braking force transmitting cables.

4. Braking means for a pedal actuated vehicle comprising: a first rotatable element and a second rotatable element; a formation between said first and second rotatable elements, said formation having engaged and disengaged positions and comprising at least one rolling element disposed in a co-operating groove which at one end has a dimension larger than that of the rolling element to permit rotation thereof and at the other end has a dimension smaller than that of the rolling element, wherein when the rolling element is disposed at said one end, the rotatable elements are in the disengaged position, and when the rolling element is disposed at said other end, the rotatable elements are in the engaged position, and are free to rotate relative to one another; a control device for moving the formation to the disengaged position during forward rotation of one rotatable element with respect to the other rotatable element, wherein the control device is arranged so that backward rotation of one rotatable element with respect to the other causes said formation to move to the engaged position; an actuating member for actuating said control device, said actuating member permitting a predetermined degree of rotation of one rotatable element with respect to the other rotatable element before causing the control device to move said formation into the engaged condition; a braking force transmitting system for connecting to a pair of brake cables; means for securing one of said rotatable elements to a rotatable drive member of the pedal actuated vehicle; and means for connecting the other rotatable element to said braking force transmitting system.

5. Braking means according to claim 4, further comprising actuating means coupled with one of the rotatable elements for actuating the control device, said actuating means being arranged so that backward rotation of said one rotatable element causes the control device to move the at least one rolling element to the engaged condition and forward rotation of said one rotatable element causes said control device to move the rolling element to the disengaged condition.

6. Braking means according to claim 4 in which the at least one rolling element is biassed towards the smaller dimension of the grooves.

7. Braking means according to claim 4, wherein said braking force transmitting system comprises: a fixed element, an arm pivoted to a connecting means, said connecting means being secured to an elongate rod, said connecting means and said rod being movable with respect to said fixed element in response to movement of said arm, said connecting means having a pair of slots to receive and retain the ends of said respective braking force transmitting cables.

8. Braking means according to claim 7 in which the control device is actuatable by means associated with one of the rotatable elements and is arranged so that backward rotation of said one rotatable element causes the control device to move the at least one rolling element to the engaged condition and forward rotation of said one rotatable element causes said control device to move the rolling element to the disengaged condition.

9. Braking means according to claim 7 in which the at least one rolling element is biassed towards the smaller dimension of the grooves.

* * * * *